United States Patent [19]

Yamaguchi

[11] Patent Number: 6,078,413
[45] Date of Patent: Jun. 20, 2000

[54] OPTICAL BRANCHING/MULTIPLEXING APPARATUS

[75] Inventor: Shohei Yamaguchi, Tokyo, Japan

[73] Assignee: NEC Corporation, Tokyo, Japan

[21] Appl. No.: 08/976,465

[22] Filed: Nov. 24, 1997

[30] Foreign Application Priority Data

Nov. 29, 1996 [JP] Japan ................................ 8-319403

[51] Int. Cl.[7] .................................................. H04J 14/02
[52] U.S. Cl. ...................... 359/124; 359/124; 359/134; 359/177
[58] Field of Search ................................ 359/124–134, 359/177

[56] References Cited

U.S. PATENT DOCUMENTS

| 5,502,589 | 3/1996 | Yamamoto et al. | 359/174 |
| 5,784,192 | 7/1998 | Sugiyama et al. | 359/341 |

FOREIGN PATENT DOCUMENTS 5-327662  12/1993  Japan.
7-154367   6/1995  Japan.
10-150433  6/1998  Japan.

*Primary Examiner*—Jason Chan
*Assistant Examiner*—Vu Lieu
*Attorney, Agent, or Firm*—Young & Thompson

[57] ABSTRACT

In an optical branching/multiplexing apparatus, to effect harmful influence to transferring characteristic of optical signal of wavelength penetrated through an optical branching device is prevented. At the optical branching device, a specific wavelength signal is subjected to an optical-branching, while another wavelength signal with exception of the specific wavelength is penetrated in wavelength division multiplexed main input signal. Multiplexed input signal is amplified by an optical amplifier 7 with variable gain, before amplified signal is divided by a photo coupler to be applied to the optical multiplexing device and to the other hand input sides of a comparator. The comparator compares reference light penetrated through the optical branching device with multiplexed light from the photo coupler, and an exciting LD module controls the optical amplifier such that quantity of light of optical signal amplified by the optical amplifier based on an error signal of the comparator agrees with optical signal penetrated through the optical branching device.

8 Claims, 5 Drawing Sheets

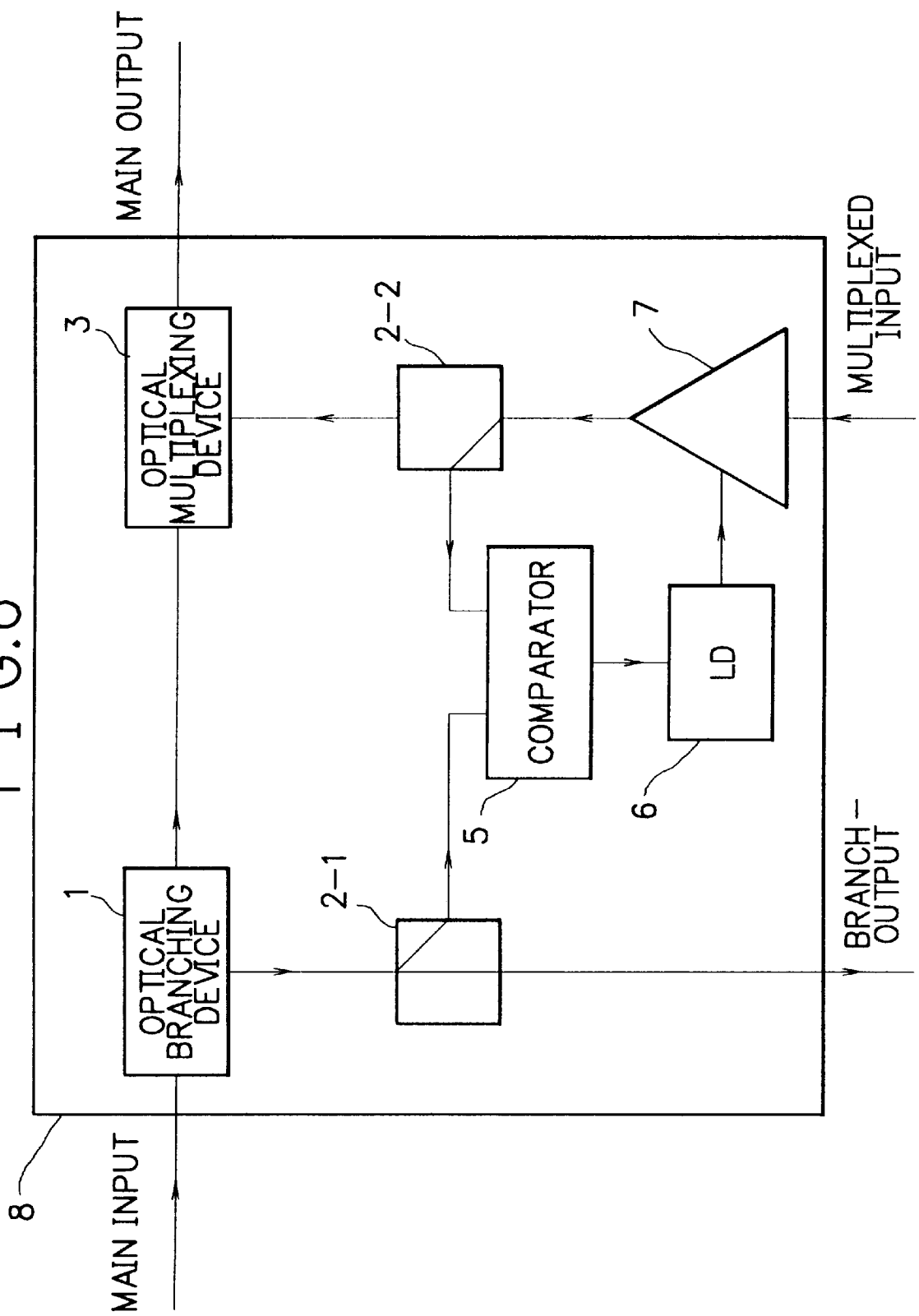

OPTICAL BRANCHING/MULTIPLEXING APPARATUS

BACKGROUND OF THE INVENTION

The present invention relates to an optical branching/multiplexing apparatus. More to particularly this invention relates to an optical branching/multiplexing apparatus which implements branching and multiplexing of wavelength in Wavelength Division Multiplexing transmission (WDM) system.

Description of the Prior Art

This kind of apparatus is called as an optical ADM (Add-Drop Modulator), and is shown in the Japanese Patent Application Laid-Open No. HEI 7-202299, or [GENERAL MEETING OF ELECTRONIC INFORMATION COMMUNICATION ASSOCIATION—1996 "Optical ADM Experiment and Limiting Content Therefor Using Fiber-Grating" pp, 747–748, March-1996 ] or the like.

FIG. 1 shows a system which implements wavelength division multiplexing transmission among local stations A, B, and C as a prior art example, wherein an optical ADM apparatus 8a is connected to among the local stations A, B, and C. The optical ADM apparatus 8a includes an optical branching device 1 and an optical multiplexing device 3. The optical branching device 1 causes a light signal with a plurality of wavelengths inputted as main input from an optical transmitter 16-1 of the local station A to branch selectively or to penetrate selectively, thus outputting a branch-signal to an optical receiver 15-2 of the local station C, and outputting penetrated signal to the optical multiplexing device 3 respectively. The optical multiplexing device 3 multiplexes the penetrated signal of the optical branching device 1 and the signal from the optical transmitter 16-2 of the local station C to output to the optical receiver 15-1 of the local station B as a main output.

However, in the above described conventional optical ADM apparatus 8a, when signal level of wavelength penetrated without branching by the optical branching device 1 differs from signal level of wavelength which is multiplexed, there is a problem that it brings harmful influence to transmission characteristic of wavelength which is penetrated.

SUMMARY OF THE INVENTION

In view of the foregoing, it is an object of the present invention to provide an optical branching/multiplexing apparatus which is capable of preventing to bring harmful influence to the transmission characteristic of light signal of wavelength penetrated through the optical branching wavelength device.

According to a first aspect of the present invention, for achieving the above-mentioned object, there is provided an optical branching/multiplexing apparatus which comprises an optical branching device for causing an optical signal of a specific wavelength in wavelength division multiplexed optical signals to be subjected to optical-branching and for causing an optical signal of another wavelength with exception of the specific wavelength to penetrate, an optical amplifier for amplifying a multiplexed input signal in accordance with laser light, an optical multiplexing device for multiplexing an optical signal penetrated through the optical branching device and an optical signal amplified by the optical amplifier, comparison means for comparing quantity of light of an optical signal penetrated through the optical branching device with an optical signal amplified by the optical amplifier, and quantity of light control means for controlling amplification degree of the optical amplifier such that quantity of light of an optical signal amplified by the optical amplifier agrees with an optical signal penetrated through the optical branching device.

According to a second aspect of the invention, there is provided an optical branching/multiplexing apparatus which comprises an optical branching device for causing an optical signal of a specific wavelength in wavelength division multiplexed optical signals to be subjected to optical-branching and for causing an optical signal of another wavelength with exception of the specific wavelength to penetrate, a first photo-coupler for separating optical signal penetrated through the optical branching device into two optical paths, an optical amplifier for amplifying a multiplexed input signal in accordance with laser light, a second photo-coupler for separating optical signal amplified by the optical amplifier into two optical paths, an optical multiplexing device for multiplexing an optical signal of one side optical path separated by the first photo-coupler and an optical signal of one side optical path separated by the second photo-coupler, a comparison means for comparing quantity of light of an optical signal of the other side optical path separated by the first photo-coupler with an optical signal of the other side optical path separated by the second photo-coupler, and quantity of light control means for controlling amplification degree of the optical amplifier such that quantity of light of an optical signal amplified by the optical amplifier agrees with an optical signal penetrated through the optical branching device.

According to a third aspect of the invention there is provided an optical branching/multiplexing apparatus which comprises an optical branching device for causing an optical signal of a specific wavelength in wavelength division multiplexed optical signals to be subjected to optical-branching and for causing an optical signal of another wavelength with exception of the specific wavelength to penetrate, an optical amplifier for amplifying a multiplexed input signal in accordance with laser light, an optical multiplexing device for multiplexing an optical signal penetrated through the optical branching device and an optical signal amplified by the optical amplifier, comparison means for comparing quantity of light of an optical signal which is subjected to optical-branching by the optical branching device with an optical signal amplified by the optical amplifier, and quantity of light control means for controlling amplification degree of the optical amplifier such that quantity of light of an optical signal amplified by the optical amplifier agrees with an optical signal penetrated through the optical branching device.

According to a fourth aspect of the invention there is provided an optical branching/multiplexing apparatus which comprises an optical branching device for causing an optical signal of a specific wavelength in wavelength division multiplexed optical signals to be subjected to optical-branching and for causing an optical signal of another wavelength with exception of the specific wavelength to penetrate, a first photo-coupler for separating an optical signal which is subjected to optical-branching by the optical branching device into two optical paths, an optical amplifier for amplifying a multiplexed input signal in accordance with laser light, a second photo-coupler for separating optical signal amplified by the optical amplifier into two optical paths, an optical multiplexing device for multiplexing an optical signal penetrated through the optical branching device and an optical signal of one side optical path separated by the second photo-coupler, a comparison means for comparing quantity of light of an optical signal of one side optical path separated by the first photo-coupler with an optical signal of the other side optical path separated by the second photo-coupler, and quantity of light control means for controlling amplification degree of the optical amplifier such that quantity of light of an optical signal amplified by the optical amplifier agrees with an optical signal penetrated through the optical branching device.

The above and further objects and novel features of the invention will be more fully understood from the following detailed description when the same is read in connection with the accompanying drawings. It should be expressly understood, however, that the drawings are for purpose of illustration only and are not intended as a definition of the limits of the invention.

BRIEF DESCRIPTION OF THE DRAWINGS

FIG. 6 is a block diagram showing a second preferable embodiment of an optical branching/multiplexing apparatus according to the present invention.

DETAILED DESCRIPTION OF THE PREFERRED EMBODIMENTS

Figure 1:
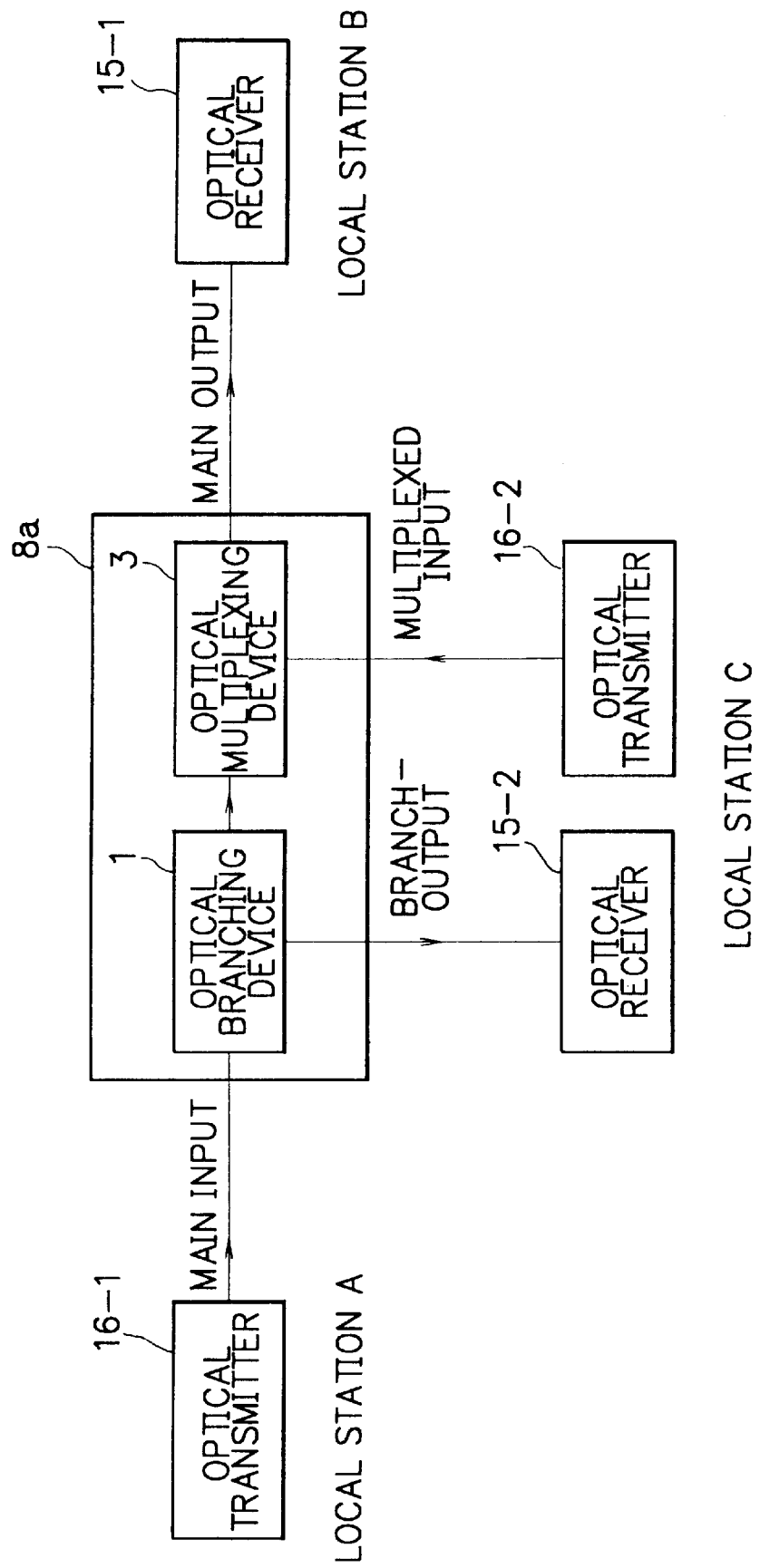
FIG. 1 is a block diagram showing the conventional optical branching/multiplexing apparatus.
Figure 2:
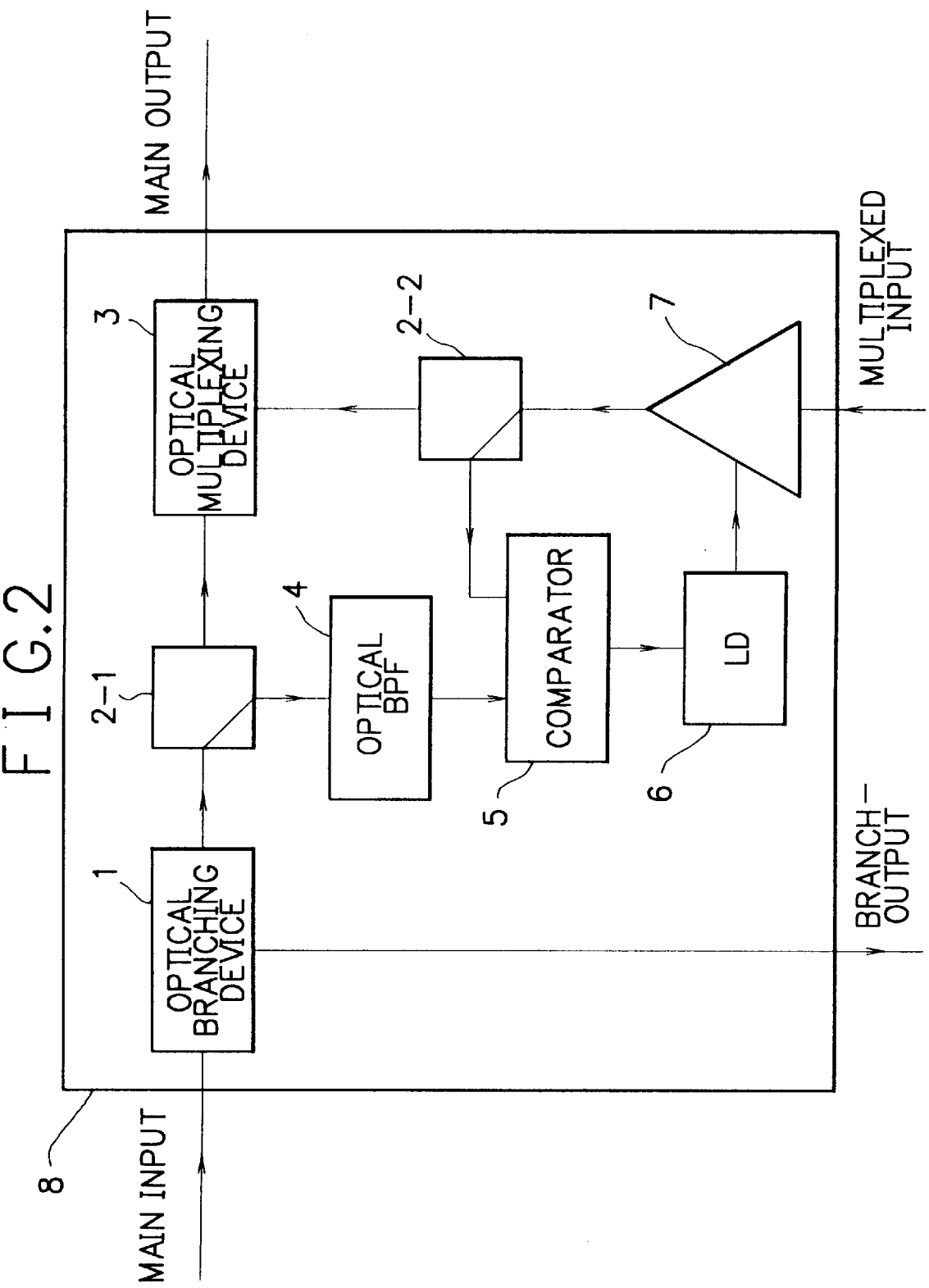
FIG. 2 is a block diagram showing one preferable embodiment of an optical branching/multiplexing apparatus according to the present invention.
Figure 3A:
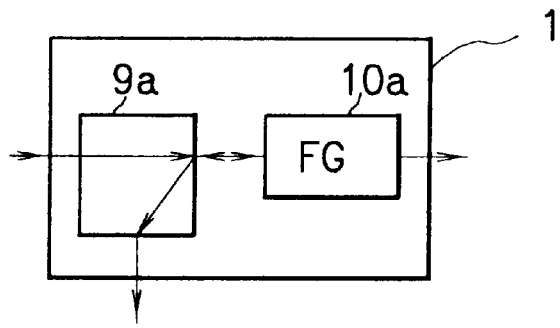
FIGS. 3A and 3B are block diagrams showing in detail two kinds of optical branching wavelength device of FIG. 1.
Figure 3B:
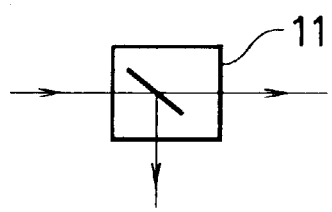
Figure 4A:
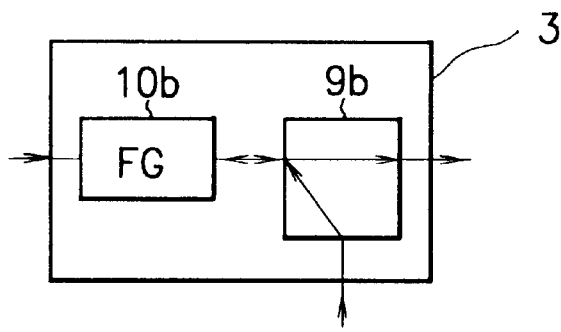
FIGS. 4A and 4B are block diagrams showing in detail two kinds of optical multiplexing wavelength device of FIG. 1.
Figure 4B:
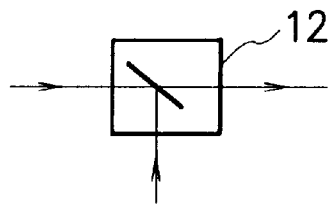
Figure 5:
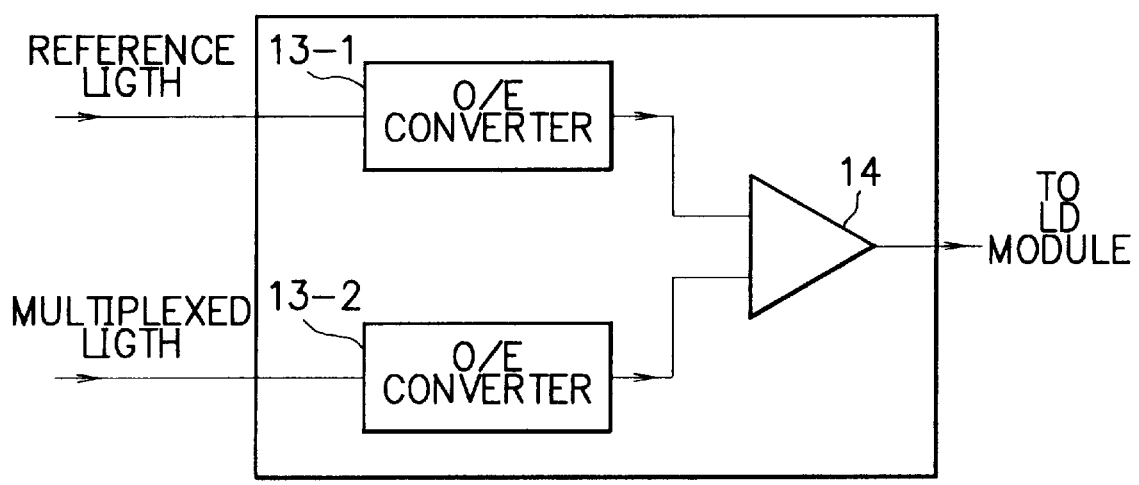
FIG. 5 is a block diagram showing in detail a comparator of FIG. 1.

A preferred embodiment of the present invention will be described in detail referring to accompanying drawings. FIG. 2 is a block diagram showing one preferable embodiment of an optical branching/multiplexing apparatus according to the present invention, FIGS. 3A and 3B are block diagrams showing in detail two kinds of optical branching wavelength device of FIG. 1, FIGS. 4A and 4B are block diagrams showing in detail two kinds of optical multiplexing wavelength device of FIG. 1, and FIG. 5 is a block diagram showing in detail a comparator of FIG. 1.

This embodiment is constituted such that it causes quantity of light of branch-input signal to control with light signal penetrated through the optical branching device 1 as reference light. In FIG. 2, the optical branching device 1 has an optical circulator 9a and a fiber grating device 10a as shown minutely in FIG. 3A. A signal of specific wavelength in the main input signal being subjected to wavelength division multiplexing at the optical circulator 9a is outputted to an FG device 10a in which the signal of specific wavelength is reflected. The signal of specific wavelength returns to the optical circulator 9a to be subjected to optical branching, then it is outputted to the outside.

A signal of another wavelength is outputted to the FG device 10a to penetrate through the FG device 10a. The signal is subjected to the optical-branching by a photo coupler 2-1 shown in FIG. 2 to be applied to the optical multiplexing device 3 and to the optical band pass filter (BPF) 4 respectively. A signal passed through the optical BPF 4 is applied to one hand input side of the comparator 5. Besides, it is preferable to use a optical branching filter 11 as shown in FIG. 3B in stead of the optical branching device 1.

A multiplexed input signal is amplified by an optical amplifier 7 with variable gain, and then is separated by a photo-coupler 2-2 to be applied to the optical multiplexing device 3 and to the other hand input side of the comparator 5. The optical multiplexing device 3 has the FG device 10b and the optical circulator 9b as shown minutely in FIG. 4A. In the optical circulator 9b, a signal inputted from the photo-coupler 2-2 is outputted to the FG device 10b in which the signal is reflected to be multiplexed together with a signal penetrated through the FG device 10a of the optical branching device 1, thus returning to the optical circulator 9b to be penetrated therethrough, then being outputted as main output signal. Besides, it is preferable to use a 3 dB coupler 12 as shown in FIG. 3C in stead of the optical multiplexing device 3.

The comparator 5 as shown in FIG. 5, comprises an O/E converter 13-1 for performing photoelectric conversion (Optical to Electrical) to the reference light passed through the optical BPF 4, an O/E converter 13-2 for performing photoelectric conversion to the multiplexed light from the photo-coupler 2-2, and a comparison circuit 14 for comparing respective output signals of the O/E convertors 13-1 and 13-2. An error signal between two input signals is outputted from the comparison circuit 14. An excitation laser diode (LD) module 6 controls the gain of the optical amplifier 7 such that quantity of light of the optical signal amplified by the optical amplifier 7 based on this error signal agrees with the optical signal penetrated through the optical branching device 1.

Next, a second embodiment will be explained referring to FIG. 6. Besides, the same reference sign is appended to the same structural member as that of the first embodiment. In the second embodiment, the apparatus is constituted so as to control the quantity of light of the branch-input signal with the optical signal being subjected to optical-branching by the optical branching device 1 as the reference light. The main input signal is subjected to wavelength division multiplexing in the optical branching device 1. The specific wavelength signal in the above main input signals is subjected to optical-branching to be separated by the photo-coupler 2-1. The divided signal is outputted to the outside and is applied to one hand input side of the comparator 5. Further, another wavelength signal with the exception of the above specific wave length signal is penetrated through the optical branching device 1 to be applied to the optical multiplexing device 3.

Further the multiplexed input signal is amplified by the optical amplifier 7 with variable gain to be separated by the photo coupler 2-2. Thus one hand of the divided input signal is inputted to the optical multiplexing device 3 and the other hand of the divided input signal is inputted to another input side of the comparator 5. In the optical multiplexing device 3, the multiplexed signal inputted from the photo coupler 2-2 is multiplexed by the signal penetrated through the optical branching device 1 to be outputted as a main output signal. The comparator 5 outputs the error signal between the reference light from the photo coupler 2-2 and the input signal of multiplexed light from the photo coupler 2-2, and the excitation LD module 6 controls the gain of the optical amplifier 7 such that the quantity of light of the optical signal amplified by the optical amplifier 7 based on the error signal agrees with the optical signal penetrated through the optical branching device 1.

As described above, according to the present invention, since signal level of the wavelength which is to be multiplexed is controlled with signal level of the wavelength penetrated through the optical branching device or signal level of the wavelength being subjected to the optical branching as the reference light, it is capable of being prevented from effecting the harmful influence to the transferring characteristic of wavelength penetrated through the optical branching device.

While preferred embodiments of the invention have been described using specific terms, such description is for illustrative purpose only, and it is to be understood that changes and variations may be made without departing from the spirit or scope of the following claims.

What is claimed is:

1. An optical branching/multiplexing apparatus comprising:

an optical branching device for causing an optical signal of a specific wavelength in wavelength division multiplexed optical signals to be subjected to optical-branching and for causing an optical signal of another wavelength with the exception of said specific wavelength to penetrate;

an optical amplifier for amplifying a multiplexed input signal in accordance with laser light;

an optical multiplexing device for multiplexing an optical signal penetrated through said optical branching device and an optical signal amplified by said optical amplifier;

comparison means for comparing quantity of light between an optical signal penetrated through said optical branching device and an optical signal amplified by said optical amplifier; and quantity of light control means for controlling amplification degree of said optical amplifier such that quantity of light of an optical signal amplified by said optical amplifier agrees with an optical signal penetrated through said optical branching device.

2. An optical branching/multiplexing apparatus comprising:

an optical branching device for causing an optical signal of a specific wavelength in wavelength division multiplexed optical signals to be subjected to optical-branching and for causing an optical signal of another wavelength with the exception of said specific wavelength to penetrate;

a first photo-coupler for separating optical signal penetrated through said optical branching device into two optical paths;

an optical amplifier for amplifying a multiplexed input signal in accordance with laser light;

a second photo-coupler for separating optical signal amplified by said optical amplifier into two optical paths;

an optical multiplexing device for multiplexing an optical signal of one hand optical path separated by said first photo-coupler and an optical signal of one hand optical path separated by said second photo-coupler;

a comparison means for comparing quantity of light between an optical signal of the other hand optical path separated by said first photo-coupler and an optical signal of the other hand optical path separated by said second photo-coupler; and quantity of light control means for controlling amplification degree of said optical amplifier such that quantity of light of an optical signal amplified by said optical amplifier agrees with an optical signal penetrated through said optical branching device.

3. An optical branching/multiplexing apparatus comprising:

an optical branching device for causing an optical signal of a specific wavelength in wavelength division multiplexed optical signals to be subjected to optical-branching and for causing an optical signal of another wavelength with the exception of said specific wavelength to penetrate;

an optical amplifier for amplifying a multiplexed input signal in accordance with laser light;

an optical multiplexing device for multiplexing an optical signal penetrated through said optical branching device and an optical signal amplified by said optical amplifier;

comparison means for comparing quantity of light between an optical signal which is subjected to optical-branching by said optical branching device and an optical signal amplified by said optical amplifier; and quantity of light control means for controlling amplification degree of said optical amplifier such that quantity of light of an optical signal amplified by said optical amplifier agrees with an optical signal penetrated through said optical branching device.

4. An optical branching/multiplexing apparatus comprising:

an optical branching device for causing an optical signal of a specific wavelength in wavelength division multiplexed optical signals to be subjected to optical-branching and for causing an optical signal of another wavelength with the exception of said specific wavelength to penetrate;

a first photo-coupler for separating an optical signal which is subjected to optical-branching by said optical branching device into two optical paths;

an optical amplifier for amplifying a multiplexed input signal in accordance with laser light;

a second photo-coupler for separating optical signal amplified by said optical amplifier into two optical paths;

an optical multiplexing device for multiplexing an optical signal penetrated through said optical branching device and an optical signal of one hand optical path separated by said second photo-coupler;

a comparison means for comparing quantity of light of an optical signal of one hand optical path separated by said first photo-coupler with an optical signal of the other hand optical path separated by said second photo-coupler; and quantity of light control means for controlling amplification degree of said optical amplifier such that quantity of light of an optical signal amplified by said optical amplifier agrees with an optical signal penetrated through said optical branching device.

5. A transmission method of an optical branching/multiplexing apparatus comprising the steps of:

causing optical signal of a specific wavelength in wavelength division multiplexed optical signals to be subjected to optical branching and simultaneously causing another wavelength optical signal with the exception of said specific wavelength to penetrate by an optical branching device;

amplifying multiplexed input signal in accordance with laser light by an optical amplifier;

multiplexing an optical signal penetrated through said optical branching device and an optical signal amplified by said optical amplifier by an optical multiplexing device;

comparing quantity of light between optical signal penetrated through said optical branching device and optical signal amplified by said optical amplifier by a comparison means; and controlling amplification degree of said optical amplifier such that quantity of light of optical signal amplified by said optical amplifier agrees with optical signal penetrated through said optical branching device by a quantity of light control means.

6. A transmission method of an optical branching/multiplexing apparatus comprising the steps of:

causing optical signal of a specific wavelength in wavelength division multiplexed optical signals to be subjected to optical branching and simultaneously causing another wavelength optical signal with the exception of said specific wavelength to penetrate by an optical branching device;

separating optical signal penetrated through said optical branching device into two optical paths by a first photo coupler;

amplifying multiplexed input signal in accordance with laser light by an optical amplifier;

separating optical signal amplified by said optical amplifier into two optical paths by a second photo coupler;

multiplexing optical signal of one hand optical path divided by said first photo coupler and optical signal of one hand optical path divided by said second photo coupler by an optical multiplexing device;

comparing quantity of light of optical signal between the other hand optical path divided by said first photo coupler with optical signal of the other hand optical path divided by said second photo coupler by a comparison means; and controlling amplification degree of said optical amplifier such that quantity of light of optical signal amplified by said optical amplifier agrees with optical signal penetrated through said optical branching device.

7. A transmission method of an optical branching/multiplexing apparatus comprising the steps of:

causing optical signal of a specific wavelength in wavelength division multiplexed optical signals to be subjected to optical branching and simultaneously causing another wavelength optical signal with the exception of said specific wavelength to penetrate by an optical branching device;

amplifying multiplexed input signal in accordance with laser light by an optical amplifier;

multiplexing an optical signal penetrated through said optical branching device and an optical signal amplified by said optical amplifier by an optical multiplexing device;

comparing quantity of light between optical signal which is subjected to optical-branching by said optical branching device and optical signal amplified by said optical amplifier by a comparison means; and controlling amplification degree of said optical amplifier such that quantity of light of optical signal amplified by said optical amplifier agrees with optical signal penetrated through said optical branching device by a quantity of light control means.

8. A transmission method of an optical branching/multiplexing apparatus comprising the steps of:

causing optical signal of a specific wavelength in wavelength division multiplexed optical signals to be subjected to optical branching and simultaneously causing another wavelength optical signal with the exception of said specific wavelength to penetrate by an optical branching device;

separating optical signal which is subjected to optical-branching by said optical branching device into two optical paths by a first photo coupler;

amplifying multiplexed input signal in accordance with laser light by an optical amplifier;

separating optical signal amplified by said optical amplifier into two optical paths by a second photo coupler;

multiplexing optical signal penetrated through said optical branching device and optical signal of one hand optical path divided by said second photo coupler by an optical multiplexing device;

comparing quantity of light between optical signal of one side optical path divided by said first photo coupler and optical signal of the other side optical path divided by said second photo coupler by a comparison means; and controlling amplification degree of said optical amplifier such that quantity of light of optical signal amplified by said optical amplifier agrees with optical signal penetrated through said optical branching device.

* * * * *